(12) United States Patent
Runyan et al.

(10) Patent No.: US 12,242,859 B2
(45) Date of Patent: Mar. 4, 2025

(54) SIMILAR BOOT TIME FOR MULTIPLE DISPLAYS

(71) Applicant: INTEL CORPORATION, Santa Clara, CA (US)

(72) Inventors: Arthur Jeremy Runyan, Folsom, CA (US); Ratheesh Purushothaman Nair, Bangalore (IN); Shailendra Singh Chauhan, Karnataka (IN); Digant H. Solanki, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 17/359,512

(22) Filed: Jun. 26, 2021

(65) Prior Publication Data

US 2021/0326149 A1    Oct. 21, 2021

(51) Int. Cl.
*G06F 9/4401*    (2018.01)
*G06F 1/3218*    (2019.01)
*G06F 13/40*    (2006.01)

(52) U.S. Cl.
CPC .......... *G06F 9/4413* (2013.01); *G06F 1/3218* (2013.01); *G06F 13/4081* (2013.01)

(58) Field of Classification Search
CPC ... G06F 9/4413; G06F 1/3218; G06F 13/4081
See application file for complete search history.

(56) References Cited

U.S. PATENT DOCUMENTS

| 5,524,249 | A | * | 6/1996 | Suboh | G09G 5/36 713/322 |
| 5,619,707 | A | * | 4/1997 | Suboh | G09G 5/36 713/322 |
| 2013/0198502 | A1 | * | 8/2013 | Rothman | G06F 9/4406 713/2 |
| 2022/0129349 | A1 | * | 4/2022 | Chaiken | G06F 11/1417 |

FOREIGN PATENT DOCUMENTS

CN    104407961 B    * 12/2017    ............... G06F 1/26

OTHER PUBLICATIONS

Translation for CN-104407961-B (Year: 2017).*

* cited by examiner

*Primary Examiner* — Henry Tsai
*Assistant Examiner* — John B Roche
(74) *Attorney, Agent, or Firm* — Banner & Witcoff Ltd.

(57) ABSTRACT

Particular embodiments described herein provide for an electronic device that includes two or more displays and a BIOS. On startup, before the premem state and MRC initialization of the boot process, the BIOS causes power to be enabled to two or more displays. A display engine determines if a hot plug for each display is asserted and for each display where the hot plug was not asserted, the path to the display where the hot plug was not asserted is closed. In an example, the BIOS communicates the signal to power enable the first display and the second display after general-purpose input/output initialization during the boot process. After the premem stage and MRC initialization are completed, the first display and the second display are both configured to begin to display pixels.

20 Claims, 9 Drawing Sheets

SIMILAR BOOT TIME FOR MULTIPLE DISPLAYS

TECHNICAL FIELD

This disclosure relates in general to the field of computing, and more particularly, to a system for enabling a similar boot time for multiple displays.

BACKGROUND

End users have more electronic device choices than ever before. A number of prominent technological trends are currently afoot and these trends are changing the electronic device landscape. Some of the technological trends involve a device that includes multiple display and in particular, dual displays.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
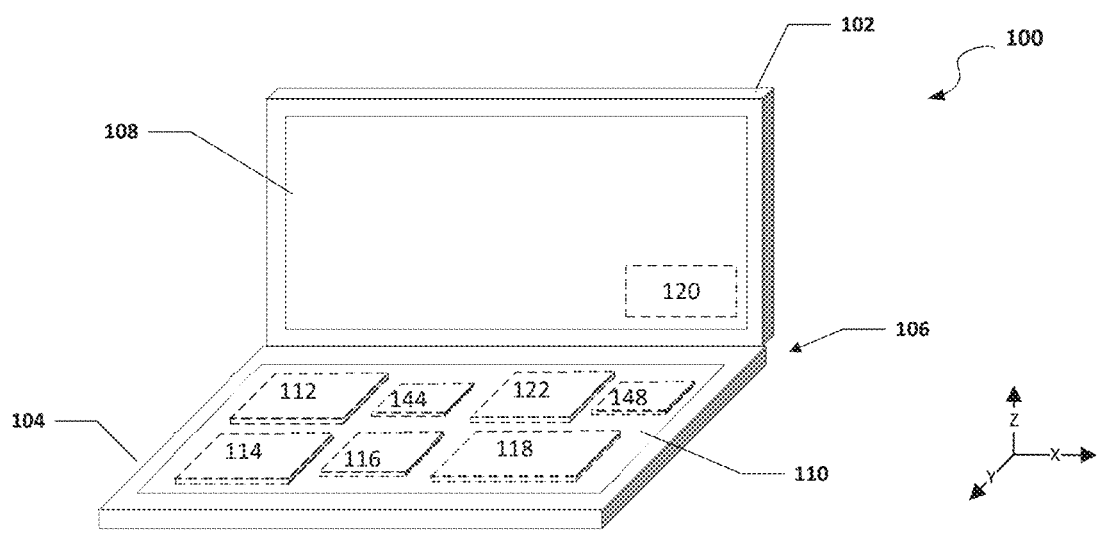
FIGS. 1A-1D are a simplified block diagram of a system to enable a similar boot time for multiple displays, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a similar boot time for multiple displays in accordance with an embodiment of the present disclosure. The terms "similar," "substantially," "close," "approximately," "near," and "about," generally refer to being within +/−20% of a target value based on the context of a particular value as described herein or as known in the art. For example, a similar boot time for multiple displays would mean that the boot time for the displays is within a +/−20% range of a boot time value. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

Figure 1B:
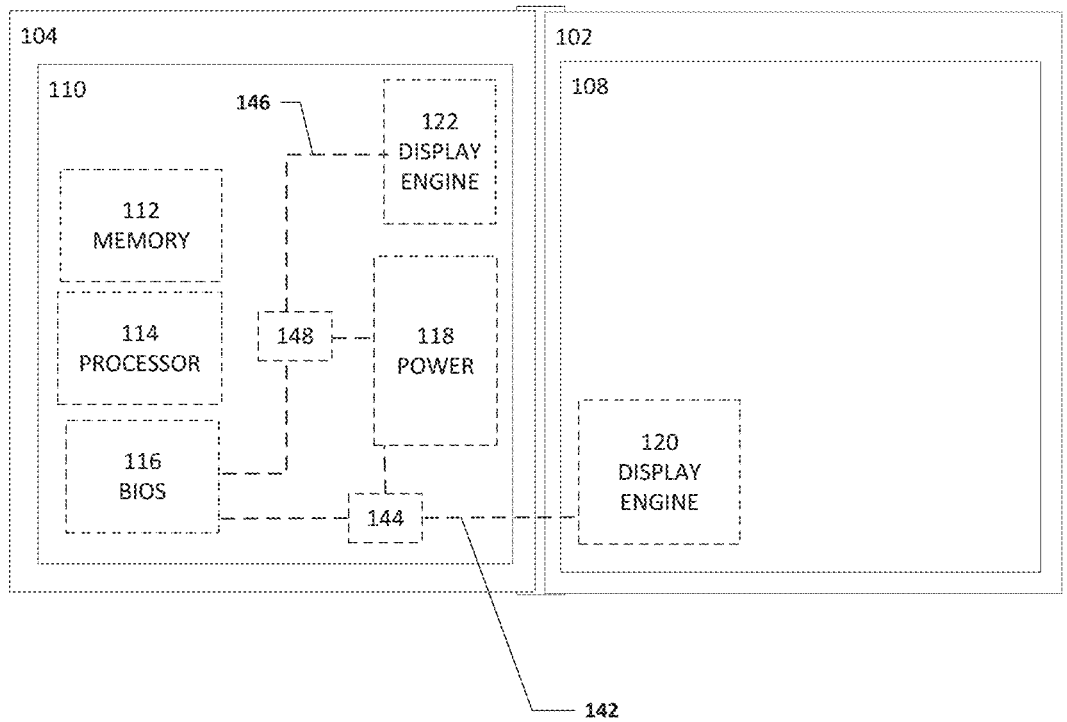
Figure 1C:
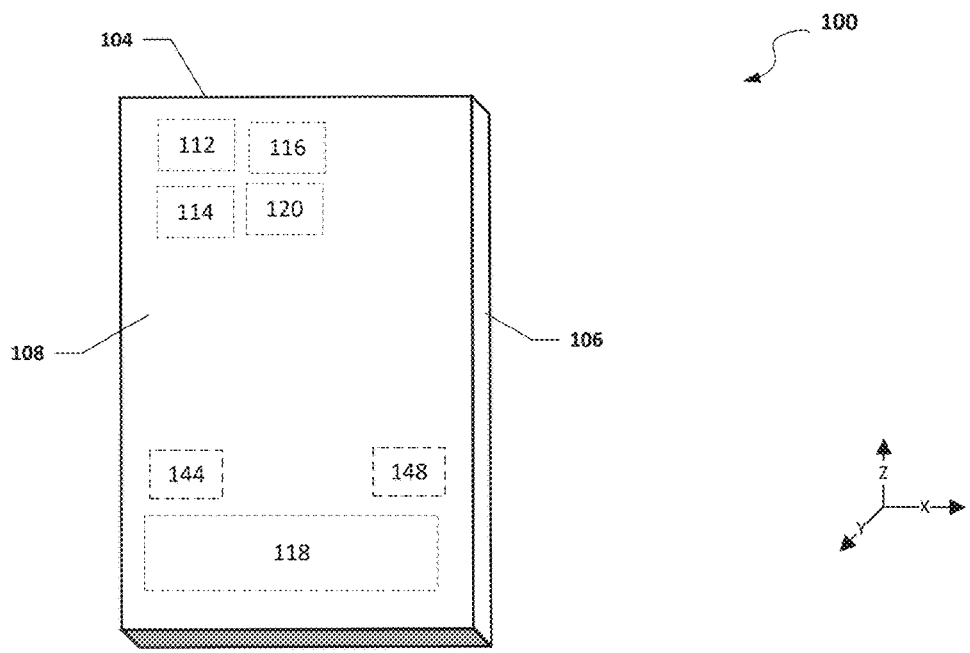

FIGS. 1A-1D are a simplified block diagram of electronic device 100 configured to enable a similar boot time for multiple displays, in accordance with an embodiment of the present disclosure. As illustrated in FIG. 1A, electronic device is in an open clamshell configuration. As illustrated in FIG. 1B, electronic device 100 is in an open, flat configuration. As illustrated in FIG. 1C, electronic device 100 is in a table configuration. In an example, an electronic device 100 can include a first housing 102 and a second housing 104. First housing 102 can be pivotably or rotatably coupled to second housing 104 using a hinge 106. First housing 102 can include a first display 108. Second housing 104 can include a second display 110. First display 108 and second display 110 can be the same type of display or may be different types of displays with different requirements, specifications, power requirements, etc. As illustrated in FIG. 1C, first housing 102 and first display 108 are behind second housing 104 and not shown.

Electronic device 100 can also include memory 112, one or more processors 114, a BIOS 116, a power source 118, a first power switch/supply 144, and a second power switch/supply 148. One or more of memory 112, processors 114, BIOS 116, power source 118, first power switch/supply 144, and second power switch/supply 148 can be located in first housing 102 and/or second housing 104. For, example, as illustrated in FIG. 1A, memory 112, one or more processors 114, BIOS 116, power source 118, first power switch/supply 144, and second power switch/supply 148 are located in second housing 104. However, one or more of memory 112, processors 114, BIOS 116, power source 118, first power switch/supply 144, and/or second power switch/supply 148 may be located in first housing 102. Power source 118 may be a battery, an AC adapter, or some other type of power source for electronic device 100. Power source 118 can supply power to first power switch/supply 144 and second power switch/supply 148. First power switch/supply 144 can power first display 108. Second power switch/supply 148 can power second display 110.

First display 108 can include a first display engine 120. First display engine 120 can be located on a system on chip (SoC) and configured to help display an image on first display 108. Second display can include a second display engine 122. Second display engine 122 can be located on an SoC and configured to help display an image on second display 110.

Figure 1D:
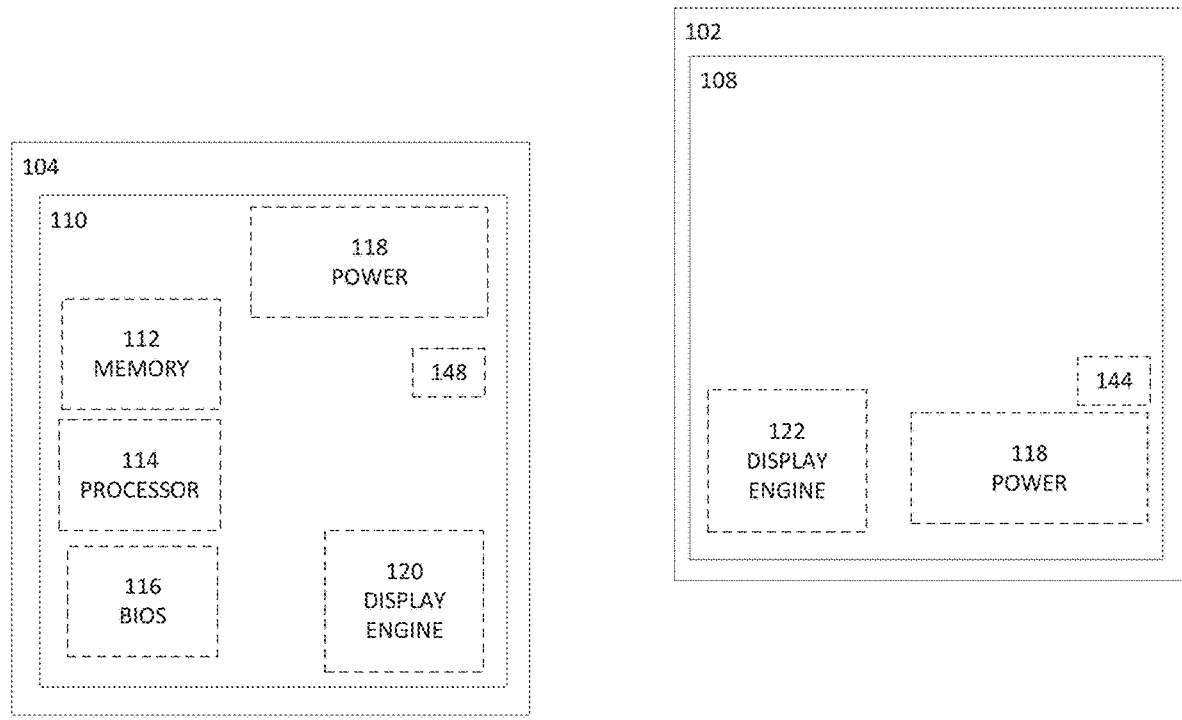

As illustrated in FIG. 1D, in some examples, first housing 102 can be detached from second housing 104. In this example, first housing 102 may include its own power source 118 and first power switch/supply 144. In other examples, first housing 102 may not include its own power and may be powered by power source 118 and first power switch/supply 144 in second housing 104 when first housing 102 is electrically connected to second housing 104.

When electronic device 100 is powered on, the boot process begins for the electronic device 100 and the BIOS sends a signal to first power switch/supply 144 to supply power to first display 108 to power up first display 108 and at about the same time, using a separate power path, the BIOS sends a second signal to second power switch/supply 148 to supply power to second display 110 to power up second display 110. More specifically, during the boot process, the BIOS can send a signal to first power switch/supply 144 to supply power to first display 108 using first display power path 142 and, at about the same time, the BIOS can send a signal to second power switch/supply 148 to power second display 110 using second display power path 146 so first display 108 and second display 110 each have their own power path. In a specific example, one or more processors 114 are executing BIOS 116 and BIOS 116 is communicating with both first display engine 120 in first display 108 and second display engine 122 in second display 110 through memory mapped input/output (MMIO) over the device's communication fabric. First display engine 120 can then assert a signal that goes out through the system's general-purpose input/output (GPIO) to first display 108 and informs first display 108 to power up. At about the same time, second display engine 122 also assert a signal that goes out through the system's GPIO to second display 110 and informs second display 110 to power up. While the displays are powering up, the system continues with the boot process.

For example, the system can perform the premem stage and memory reference code (MRC) initialization of the boot process. After the premem stage and MRC initialization are completed, both displays will be booted up and can begin to display pixels. The VBT configuration check can be executed and the operating system boot can be completed. This allows both displays to have a similar boot time and both display to be online early in the system start-up process while allowing independent control of the displays and each display can enter a low power state independent of other displays. The premem stage is part of the boot process that includes security authentication, input/output initialization, and other initializations. The MRC initialization determines how the RAM will be initialized and adjusts memory timing algorithms to accommodate the effects of any modifications set by the user or system hardware.

It is to be understood that other embodiments may be utilized and structural changes may be made without departing from the scope of the present disclosure. Substantial flexibility is provided in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of an electronic device configured to enable a similar boot time for multiple displays, the following foundational information may be viewed as a basis from which the present disclosure may be properly explained. Generally, a display (e.g., display panel, computer display, computer monitor, monitor, etc.) is an output device that displays information in pictorial form.

Generally, clamshell devices are devices where a first housing is rotatably coupled to a second housing. For example, a clamshell device can be a laptop, notebook computer or other a small, portable personal computer with a clamshell form factor typically having a computer display mounted on the inside of an upper first housing of the clamshell and an alphanumeric keyboard on the inside of a lower second housing of the clamshell. The clamshell is opened to use the device and folded shut for transportation or storage. Some users use the electronic device for gaming, graphic arts, high performance usage, etc. and prefer to use two screens. However, using two displays in a portable device can create problems. One issue is with the boot times of the displays.

More specifically, some systems have a second display, for example as a dual display or dual screen device and foldable display devices. The display panels are powered through control signals driven from GPIO initialization. GPIO is part of the power on self-test (POST) where interfaces are being scanned, the system determines what is connected to the device, etc. Powering up an internal display panel can take up to 200 ms (eDP specification maximum and panel implementation) before an image can be displayed. System designs have been sharing the panel power controls between the first and second internal displays, but users (e.g., some OEMs) want to have independent power controls for power savings and for applications (e.g., differently sized companion displays to enrich the end user experience). Some current designs support the independent power control, but with a measurable delay in boot time. When a computer system that has a second display (e.g., a companion eDP display), there is an additional delay required for overall system boot.

In some systems, the first display's power is programmed to be enabled by system BIOS, early in the boot process, and the second display's power is programmed to be enabled by a driver using the graphics output protocol (GOP), approximately one second later. The GOP driver must then wait for the second display to complete powering up before displaying boot screens on either display. This delays the boot time by up to 200 ms (depending on display selection), impacting the user experience and operating system boot time requirements.

The GOP driver is a replacement for legacy video BIOS and enables the use of UEFI pre-boot firmware without CSM. The GOP driver can be 32 bits, 64 bits, or IA 64 with no binary compatibility. UEFI pre-boot firmware architecture must match the GOP driver architecture (e.g., 32 bit or 64 bit). The GOP driver can either be a fast boot where it is speed optimized and platform specific or a generic boot that is platform agnostic for selective platforms. EFI defines two types of services, boot services and runtime services. Boot services are available only while the firmware owns the platform (e.g., before the Exit Boot Service call and the operating system takes over) and they include text and graphical consoles on various devices and bus, block, and file services. Runtime services are still accessible while the operating system is running and they include services such as date, time, and NVRAM access. In addition, the GOP protocol provides support for limited runtime services. The operating system is permitted to directly write to the frame buffer provided by GOP during the runtime mode. However, the ability to change video modes is lost after transitioning to runtime services mode until the operating system graphics driver is loaded.

One way to enable a similar boot time for multiple displays is to use a single power supply connection for the multiple displays. However, using a single power supply connection for the multiple displays does not allow for independent power control for each of the multiple displays. More specifically, using a single power supply connection for the multiple displays does not allow one or more of the multiple displays to enter into a lower power mode while another display is still active (e.g., in a tablet configuration where one display is in a full power mode and still active while the other display can be in a low power mode to save power). Entering into a lower power mode helps lower the display power, which in turn lowers the system power and increases battery life. While the display is in the lower power mode, the display may be "off" or not displaying an image, the backlight of the display may be off or reduced, an image on the display may not be refreshed, the refresh rate may be very low, or the display may be in some other configuration that allows power to be saved while the display is in the low power mode.

The refresh rate is the number of times in a second that a display hardware updates its buffer. This is distinct from the measure of frame rate. The refresh rate includes the repeated drawing of identical frames, while frame rate measures how often a display engine can feed an entire frame of new data to the display in a video stream. The refresh rate is the number of times the display updates with new images each second. For example, a sixty (60) Hz refresh rate means the display updates sixty (60) times per second. In case of dual display systems, it can be even more important to lower the refresh rate because there are twice the power savings opportunities and/or sometimes only one display needs to have a higher refresh rate.

Unless the display is in the low power mode, the image on the display is typically refreshed sixty (60) times a second where every $60^{th}$ of a second, a graphics engine (e.g., a processor, dedicated graphics processor, source, etc.) will generate a new image to display and send it to the display. Most displays have a TCON. The TCON will receive image data from the graphics engine and the TCON is responsible for turning off and on the pixels that will generate the image. If there is no new image data received from the graphics engine, the display will still refresh at sixty (60) Hz per second because the pixels in the display will decay away if not refreshed. A static image on a display is not really a static image, even though the image is not changing because it is being rewritten or redisplayed sixty (60) times a second for a display with a sixty (60) Hz refresh rate.

More specifically, a graphics engine (e.g., computer processing unit (CPU), graphics processing unit (GPU) video processor, etc.) communicates with a TCON and the TCON is configured to drive the display. Most video processors communicate with the TCON using the embedded DisplayPort (eDP) specification. The eDP specification was developed to be used specifically in embedded display applications such as laptops, notebook computers, desktops, all-in-one personal computers, etc. The graphics engine needs to keep sending video signals to the TCON at a constant rate. This rate, known as frame rate, is typically at least sixty (60) Hz, meaning that the graphics engine has to send the video signal in a video stream to the TCON at least sixty (60) times per second, even when there is no change in the image because most display panels are such that the pixels will decay away if not refreshed. This can consume a relatively large amount of power so panel self-refresh (PSR) was developed to save power for full-screen images. The idea behind PSR is to shut down the graphics engine and associated circuitry when the image to be displayed on a display is static. More specifically, most current TCONs include a frame buffer and the frame buffer in the TCON can maintain a display image without receiving video image data from the graphics engine. For a static image, this allows the graphics engine to enter a low-power state. Allowing the graphics engine to power down between display updates can save some power and extend the battery life. Panel self-refresh with selective update (PSR2) is a superset of the panel self-refresh feature and it allows the transmission of modified areas within a video frame and a low latency self-refresh state. PSR2 identifies when only a portion of the screen is static, which is a selective update.

As stated above, one way to enable a similar boot time for multiple displays is to use a single power supply connection for the multiple displays. However, using a single power supply connection for the multiple displays does not allow for independent power control of each of the multiple displays. More specifically, using a single power supply connection for the multiple displays does not allow for one or more of the multiple displays to enter into a lower power mode while another display is still active (e.g., in a tablet configuration where one display is in a full power mode and still active while the other display can be in a low power mode).

If each display is powered up separately with a separate power supply to allow for independent power control of each of the multiple displays, then there is a lag because the first display's power is programmed to be enabled by system BIOS, early in boot but the second display's power is programmed to be enabled by a driver using the graphics output protocol (GOP), approximately one second later. Because the second display's power is enabled using GOP and not by the system BIOS, the GOP driver must wait for the second display to complete powering up before boot screens can be displayed on either display. This delays the boot time by up to 200 ms (depending on panel selection), impacting the end user experience and operating system boot time requirements.

A system and method to help enable a similar boot time for multiple displays can resolve these issues (and others). In an example, when the system is powered on, power is enabled for a predetermined number of displays (e.g., two displays, three displays, ten displays, one-hundred displays, etc.) without the system knowing how many displays are in the system. The predetermined number of displays depends on system requirements and design constraints. For example, for one-hundred displays, each display would need a separate power path and the system would need the power, logic, and processing to control each of the one-hundred displays.

In an illustrative example, when the system is powered on, the BIOS of the system enables the power for two displays without the system knowing if two displays are present. If two displays are present, then the first display and the second display each set a display sensor hot plug detect at about the same time meaning each display is ready for the display initialization at about the same time and the two displays will have a similar boot time. If the second display is not present, the second display sensor hot plug is not detected or set and the system knows the second display is not present and the path to the second display can be closed or ignored.

A convenient feature of most modern displays is the ability to be "hot plugged" into a source device while both the display and the source device are powered on. This differs from older technology which often needed to be "cold-plugged" with one or both devices powered off. Hot Plug Detect or "HPD" is a feature of the HDMI, display port, and DVI specifications that indicates a display is ready to start displaying pixels. Typically, it relies on a single pin in the connector making contact, which initiates the process. This behavior is made possible by three features: hot plug detection, the display data channel (DDC), and extended display identification data (EDID). The DDC describes both the protocol and physical path used by the source and display to communicate with each other. It is typically assigned to a pin or pins on an interface and carries the EDID. Instead of a dedicated DDC, display port uses a multifunction "AUX Channel" that serves as both a medium for user data (typically USB) and as a means to transmit EDID and other topology information. EDID is information provided by the display to describe its capabilities and requirements to the source device. EDID contains information such as the manufacturer, serial number, maximum resolution, refresh rate, and color spaces.

In a specific example, when a system is powered on, power is supplied to both displays but on two different paths (e.g., first display power path 142 and second display power path 146). The first path goes to the first display and the second path goes to second display. If the second display is present, by the time the system gets to the VBT configuration check, the hot plug for the second display will not be asserted so the system knows there is not a second display. By powering each display with a different power path, each display can enter a low power state independent of other displays In an example implementation, electronic device 100 is meant to encompass an electronic device that includes multiple displays, especially a computer, laptop, electronic notebook, hand held device, wearables, network elements that have multiple displays, or any other device, component, element, or object that has multiple displays. Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

Electronic device 100 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100 may include virtual elements.

In regards to the internal structure associated with electronic device 100, electronic device 100 can include memory elements for storing information to be used in the operations outlined herein. Electronic device 100 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic device 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic device 100 may include software modules (e.g., first display engine 120 and second display engine 122) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic device 100 may include one or more processors that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Figure 2:
FIG. 2 is a simplified flowchart illustrating potential operations that may be associated with the system in accordance with an embodiment of the present disclosure.

Turning to FIG. 2, FIG. 2 is an example flowchart illustrating possible operations of a flow 200 that may be associated with enabling a similar boot time for multiple displays, in accordance with an embodiment. In an embodiment, one or more operations of flow 200 may be performed by first display engine 120 and second display engine 122. At 202, a system is powered on and begins POST and GPIO initialization of a boot process for the system. At 204, the system BIOS power enables a first display and a second display. At 206, the system performs a premem stage and MRC initialization of the boot process. At 208, the system performs a VBT configure check and at this point, both of the displays should be booted and ready to display pixels. At 210, the operating system boot is completed.

Figure 3:
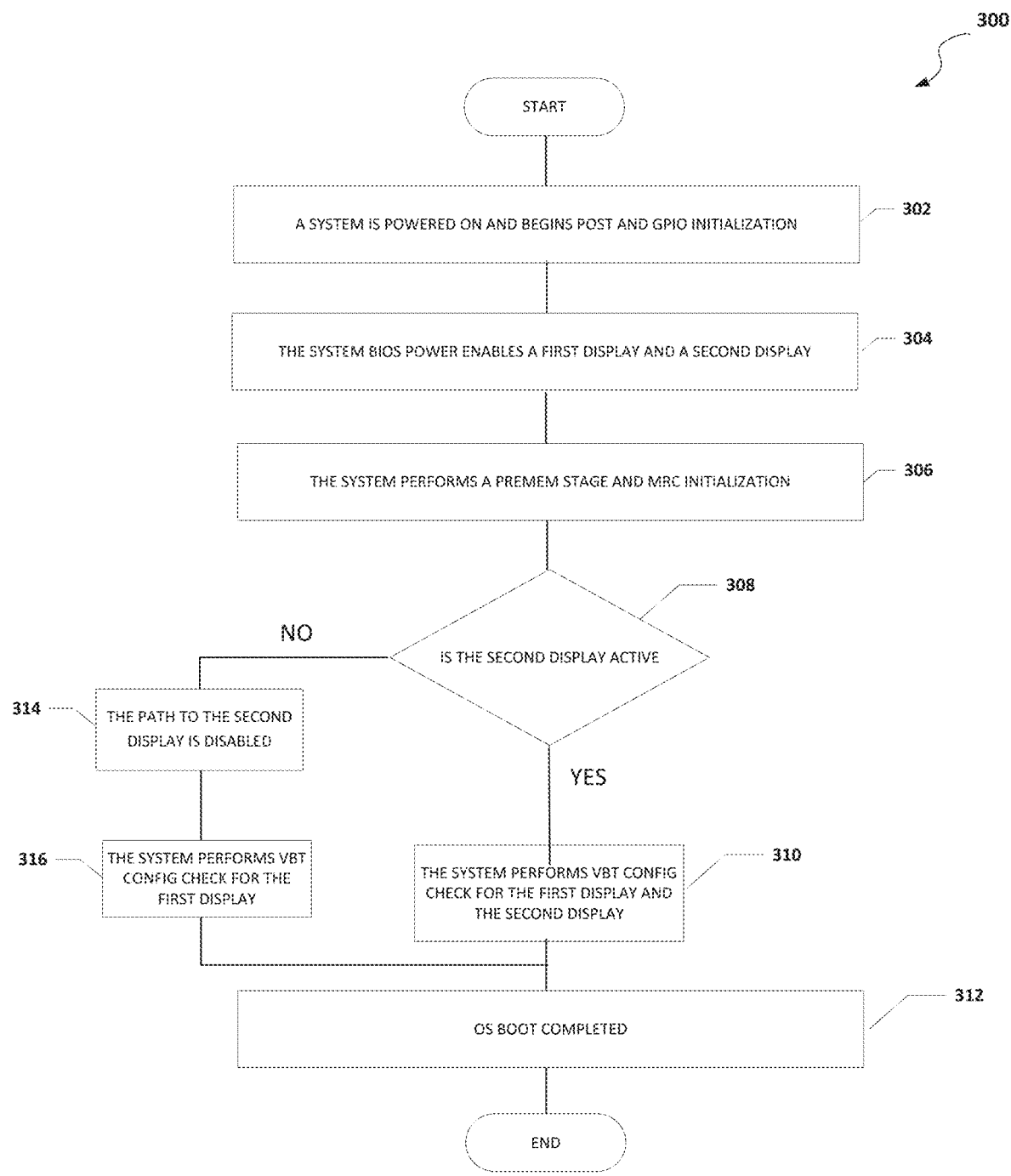
FIG. 3 is a simplified flowchart illustrating potential operations that may be associated with the system in accordance with an embodiment of the present disclosure.

Turning to FIG. 3, FIG. 3 is an example flowchart illustrating possible operations of a flow 300 that may be associated with enabling a similar boot time for multiple displays, in accordance with an embodiment. In an embodiment, one or more operations of flow 300 may be performed by first display engine 120 and second display engine 122. At 302, a system is powered on and begins POST and GPIO initialization as part of a boot process. At 304, the system BIOS power enables a first display and a second display. At 306, the system performs a premem stage and MRC initialization of the boot process. At 308, the system determines if the second display is active. For example, the system may determine if the second display sensor hot plug is set. The set hot plug indicates that the display is ready to start displaying pixels. In other examples, the system may use other means to determine if a display is ready to start displaying pixels (e.g., querying the display with a sideband communication path, waiting a fixed amount of time, etc.). If the system determines the second display is active, then the system performs a VBT configuration check for the first display and the second display, as in 310. At 312, the operating system boot is completed. If the system determines the second display is not active, then the path to the second display is disabled or closed, as in 314. At 316, the system performs a VBT configuration check for the first display. At 312, the operating system boot is completed.

Figure 4:
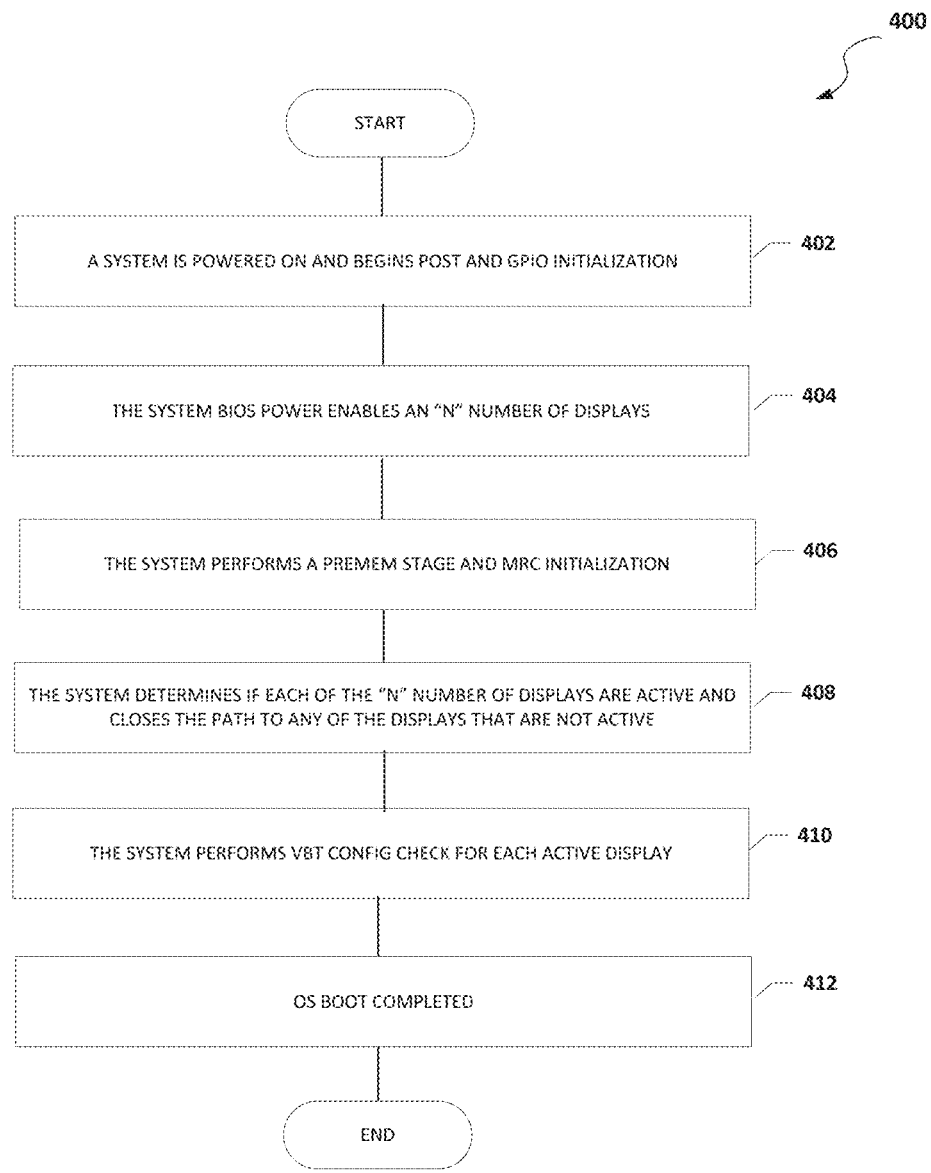
FIG. 4 is a simplified flowchart illustrating potential operations that may be associated with the system in accordance with an embodiment of the present disclosure.

Turning to FIG. 4, FIG. 4 is an example flowchart illustrating possible operations of a flow 400 that may be associated with enabling a similar boot time for multiple displays, in accordance with an embodiment. In an embodiment, one or more operations of flow 400 may be performed by first display engine 120, second display engine 122, and, in this example, any other number of "N" display engines similar to first display engine 120 and second display engine 122. At 402, a system is powered on and begins POST and GPIO initialization as part of a boot process. At 404, the system BIOS power enables an "N" number of displays. At 406, the system performs a premem stage and MRC initialization of the boot process. At 408, the system determines if each of the "N" number of displays are active and closes the path to any of the displays that are not active. For example, the system may determine if a display is active by determining if the sensor hot plug for the display is set. The set hot plug indicates that the display is ready to start displaying pixels. In other examples, the system may use other means to determine if a display is ready to start displaying pixels (e.g., querying the display with a sideband communication path, waiting a fixed amount of time, etc.). At 410, the system performs a VBT configure check for each active display. At 412, the operating system boot is completed.

Figure 5:
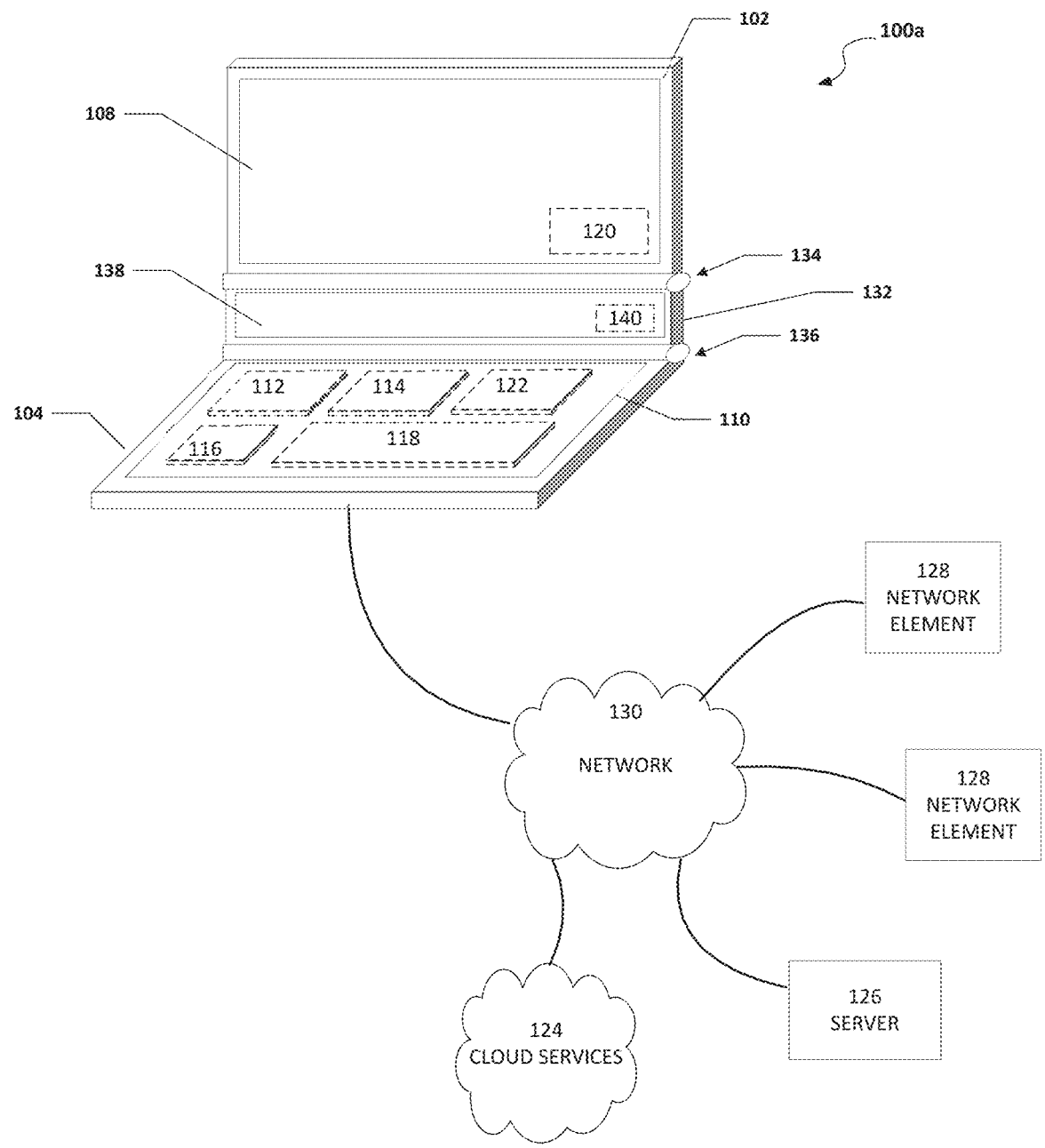
FIG. 5 is a simplified block diagram of an electronic device that includes a system to enable a similar boot time for multiple displays, in accordance with an embodiment of the present disclosure.

Turning to FIG. 5, FIG. 5 is a simplified block diagram of electronic device 100a configured to enable a similar boot time for multiple displays, in accordance with an embodiment of the present disclosure. In an example, electronic device 100a can include first housing 102, second housing 104, and a third housing 132. First housing 102 can be pivotably or rotatably coupled to third housing 132 using a first hinge 134. Third housing 132 can be pivotably or rotatably coupled to second housing 104 using second hinge 136. First housing 102 can include first display 108. Second housing 104 can include second display 110. Third housing 132 can include third display 138. Electronic device 100a can also include memory 112, one or more processors 114, BIOS 116, and power source 118. First display 108 can include first display engine 120. Second display can include second display engine 122. Third display 138 can include third display engine 140.

Electronic device 100a may be a standalone device or in communication with cloud services 124, one or more servers 126 and/or one or more network elements 128 using network 130. Network 130 represents a series of points or nodes of interconnected communication paths for receiving and transmitting packets of information. Network 130 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 130, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Figure 6:
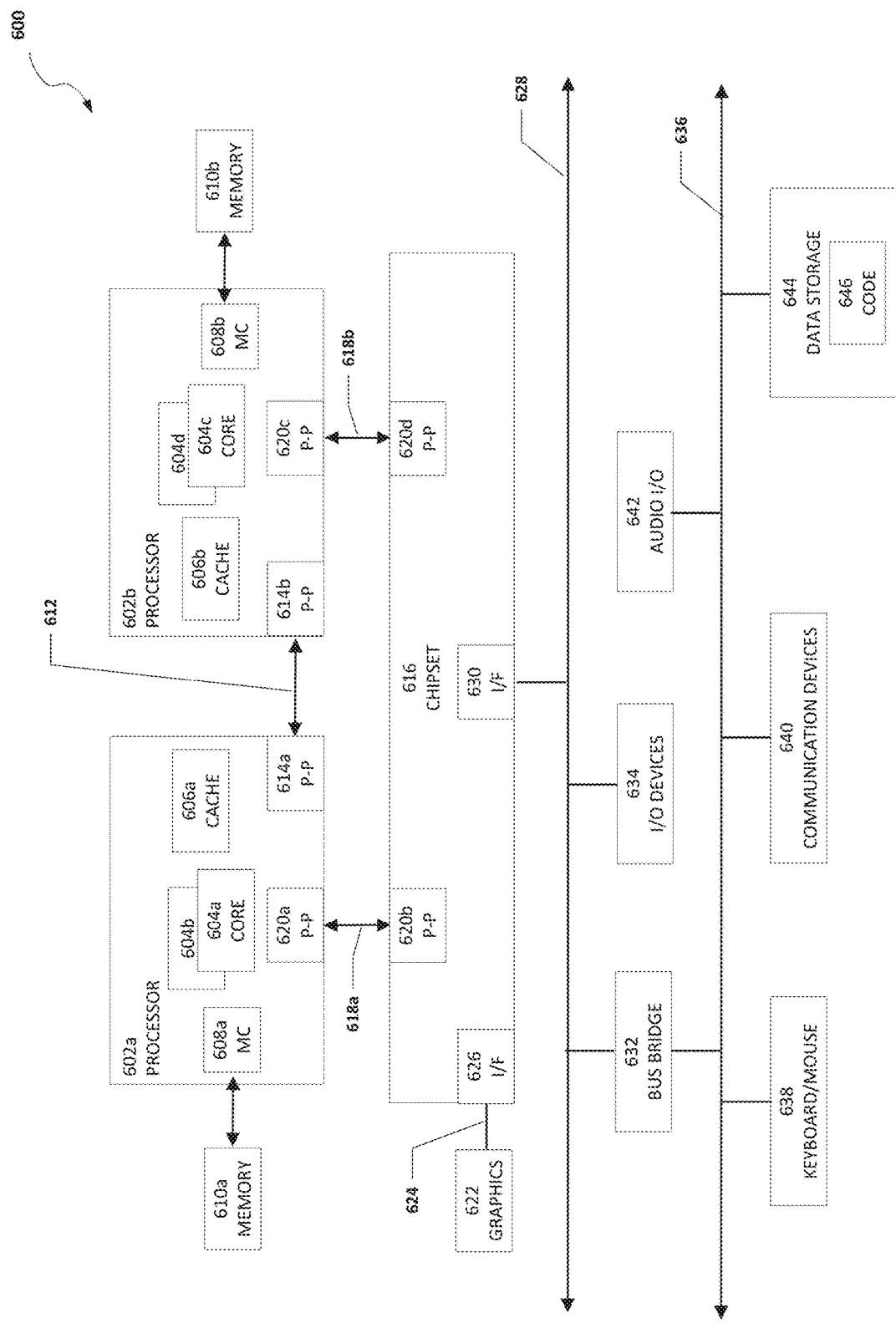
FIG. 6 is a block diagram illustrating an example computing system that is arranged in a point-to-point configuration in accordance with an embodiment.

Turning to FIG. 6, FIG. 6 illustrates a computing system 600 that is arranged in a point-to-point (PtP) configuration according to an embodiment to help facilitate enabling a similar boot time for multiple displays. In particular, FIG. 6 shows a system where processors, memory, and input/output devices are interconnected by a number of point-to-point interfaces. Generally, electronic device 100 may be configured in the same or similar manner as computing system 600.

As illustrated in FIG. 6, system 600 may include several processors, of which only two, processors 602a and 602b, are shown for clarity. While two processors 602a and 602b are shown, it is to be understood that an embodiment of system 600 may also include only one such processor. Processors 602a and 602b may each include a set of cores (i.e., processors cores 604a and 604b and processors cores 604c and 604d) to execute multiple threads of a program. The cores may be configured to execute instruction code in a manner similar to that discussed above with reference to FIGS. 1-5. Each processor 602a and 602b may include at least one shared cache 606a and 606b respectively. Shared caches 606a and 606b may each store data (e.g., instructions) that are utilized by one or more components of processors 602a and 602b, such as processor cores 604a and 604b of processor 602a and processor cores 604c and 604d of processor 602b.

Processors 602a and 602b may also each include integrated memory controller logic (MC) 608a and 608b respectively to communicate with memory elements 610a and 610b. Memory elements 610a and/or 610b may store various data used by processors 602a and 602b. In alternative embodiments, memory controller logic 608a and 608b may be discrete logic separate from processors 602a and 602b.

Processors 602a and 602b may be any type of processor and may exchange data via a point-to-point (PtP) interface 612 using point-to-point interface circuits 614a and 614b respectively. Processors 602a and 602b may each exchange data with a chipset 616 via individual point-to-point interfaces 618a and 618b using point-to-point interface circuits 620a-620d. Chipset 616 may also exchange data with a high-performance graphics circuit 622 via a high-performance graphics interface 624, using an interface circuit 626, which could be a PtP interface circuit. In alternative embodiments, any or all of the PtP links illustrated in FIG. 6 could be implemented as a multi-drop bus rather than a PtP link.

Chipset 616 may be in communication with a bus 628 via an interface circuit 630. Bus 628 may have one or more devices that communicate over it, such as a bus bridge 632 and I/O devices 634. Via a bus 636, bus bridge 632 may be in communication with other devices such as a keyboard/mouse 638 (or other input devices such as a touch screen, trackball, etc.), communication devices 640 (such as modems, network interface devices, or other types of communication devices that may communicate through a network), audio I/O devices 642, and/or a data storage device 644. Data storage device 644 may store code 646, which may be executed by processors 602a and/or 602b. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
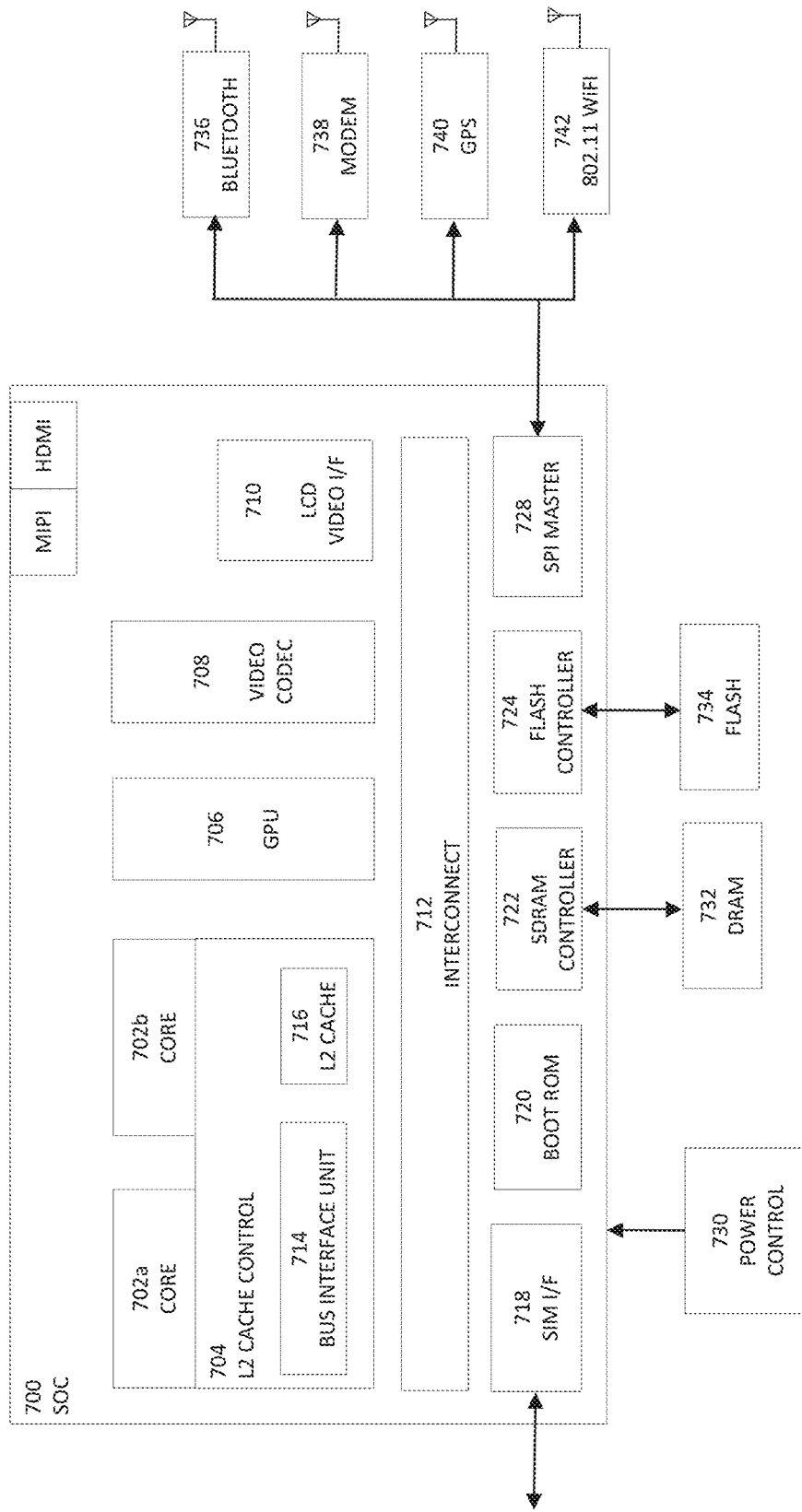
FIG. 7 is a simplified block diagram associated with an example ARM ecosystem system on chip (SOC) of the present disclosure.

Turning to FIG. 7, FIG. 7 is a simplified block diagram associated with an example ecosystem SOC 700 of the present disclosure. At least one example implementation of the present disclosure can include the enabling a similar boot time for multiple displays features discussed herein and an ARM component. For example, the example of FIG. 7 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ecosystem SOC 700 may include multiple cores 702a and 702b, an L2 cache control 704, a graphics processing unit (GPU) 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/high-definition multimedia interface (HDMI) links that couple to an LCD.

Ecosystem SOC 700 may also include a subscriber identity module (SIM) I/F 718, a boot read-only memory (ROM) 720, a synchronous dynamic random-access memory (SDRAM) controller 722, a flash controller 724, a serial peripheral interface (SPI) master 728, a suitable power control 730, a dynamic RAM (DRAM) 732, and flash 734. In addition, one or more embodiments include one or more communication capabilities, interfaces, and features such as instances of Bluetooth™ 736, a 3G modem 738, a global positioning system (GPS) 740, and an 802.11 Wi-Fi 742.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
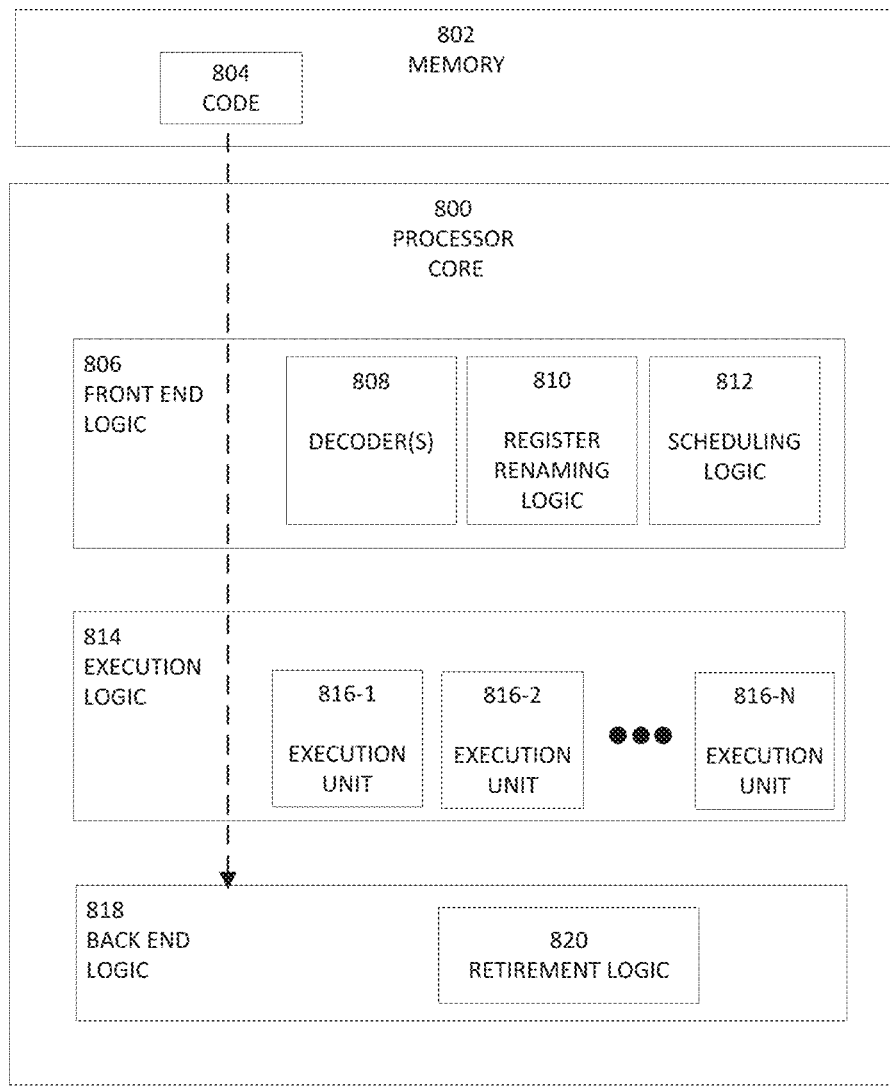
FIG. 8 is a block diagram illustrating an example processor core in accordance with an embodiment.

Turning to FIG. 8, FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 604a-604d shown and described with reference to processors 602a and 602b of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

It is also important to note that the operations in the preceding diagrams (e.g., FIGS. 2-5) illustrates only some of the possible scenarios and patterns that may be executed by, or within, electronic device 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic device 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic device 100 have been illustrated with reference to particular elements and operations, these elements and operations may be replaced by any suitable architecture, protocols, and/or processes that achieve the intended functionality of electronic device 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, an electronic device can include a first display, a second display, and a basic input/output system (BIOS). During a boot process for the electronic device, before a premem stage and memory reference code (MRC) initialization, the BIOS communicates a signal to power enable the first display and the second display.

In Example A2, the subject matter of Example A1 can optionally include where the BIOS communicates the signal to power enable the first display and the second display after general-purpose input/output initialization during the boot process.

In Example A3, the subject matter of any one of Examples A1-A2 can optionally include where after the premem stage and MRC initialization are completed, the first display and the second display are both configured to begin to display pixels.

In Example A4, the subject matter of any one of Examples A1-A3 can optionally include a first power switch/supply associated with the first display, wherein the first power switch/supply receives the signal from the BIOS to power enable the first display and a second power switch/supply associated with the second display, wherein the second power switch/supply receives the signal from the BIOS to power enable the second display.

In Example A5, the subject matter of any one of Examples A1-A4 can optionally include a first display engine to determines if a hot plug is asserted for the first display and a second display engine to determines if a hot plug is asserted for the second display.

In Example A6, the subject matter of any one of Examples A1-A5 can optionally include where for each display where the hot plug was not asserted, a power path to the display where the hot plug was not asserted is closed.

In Example A7, the subject matter of any one of Examples A1-A6 can optionally include where the first display and the second display each have their own power path and the first display and the second display can independently enter a low power state.

Example M1 is a method including determining that an electronic device is powered on, starting a boot process for the electronic device, using a basic input/output system (BIOS), power enabling a predetermined number of displays before a premem state and memory reference code (MRC) initialization of the boot process, determining if each display from the predetermined number of displays is active, and closing a power path to any displays that are not active.

In Example M2, the subject matter of Example M1 can optionally include where each active display has its own power path.

In Example M3, the subject matter of any one of the Examples M1-M2 can optionally include where a display engine determines if a hot plug for each display is asserted and the hot plug for a specific display is used to determine if the specific display is active.

In Example M4, the subject matter of any one of the Examples M1-M3 can optionally include where for each display where the hot plug was not asserted, the power path to the display where the hot plug was not asserted is closed.

In Example M5, the subject matter of any one of the Examples M1-M4 can optionally include where each active display has its own power path and can enter a low power state independent of other displays.

In Example, M6, the subject matter of any one of the Examples M1-M5 can optionally include where the BIOS causes power to be enabled to the predetermined number of displays after general-purpose input/output initialization.

In Example, M7, the subject matter of any one of the Examples M1-M6 can optionally include where the electronic device includes two displays.

Example S1 is a system for enabling a similar boot time for multiple displays in an electronic device. The system can include a power supply and a basic input/output system (BIOS), wherein on startup of the electronic device, during a boot process, the BIOS causes power from the power supply to be enabled to each of the multiple displays on a separate power path.

In Example S2, the subject matter of Example S1 can optionally include where the BIOS causes the power to be enabled to the multiple displays before a premem state and memory reference code (MRC) initialization of the electronic device.

In Example S3, the subject matter of any one of the Examples S1-S2 can optionally include where a display engine determines if a hot plug for each display is asserted.

In Example S4, the subject matter of any one of the Examples S1-S3 can optionally include where for each display where the hot plug was not asserted, the power path to the display where the hot plug was not asserted is closed.

In Example S5, the subject matter of any one of the Examples S1-S4 can optionally include where each active display has its own power path and can enter a low power state independent of other displays.

In Example S6, the subject matter of any one of the Examples S1-S5 can optionally include where the BIOS causes power to be enabled to the multiple displays after general-purpose input/output initialization.

Example AA1 is an apparatus including means for determining that an electronic device is powered on, means for starting a boot process for the electronic device, means for using a basic input/output system (BIOS), power enabling a predetermined number of displays before a premem state and memory reference code (MRC) initialization of the boot process, means for determining if each display from the predetermined number of displays is active, and means for closing a power path to any displays that are not active.

In Example AA2, the subject matter of Example AA1 can optionally include where each active display has its own power path.

In Example AA3, the subject matter of any one of Examples AA1-AA2 can optionally include where a display engine determines if a hot plug for each display is asserted and the hot plug for a specific display is used to determine if the specific display is active.

In Example AA4, the subject matter of any one of Examples AA1-AA3 can optionally include where for each display where the hot plug was not asserted, the power path to the display where the hot plug was not asserted is closed.

In Example AA5, the subject matter of any one of Examples AA1-AA4 can optionally include where each active display has its own power path and can enter a low power state independent of other displays.

In Example AA6, the subject matter of any one of Examples AA1-AA5 can optionally include where the BIOS causes power to be enabled to the predetermined number of displays after general-purpose input/output initialization.

In Example AA7, the subject matter of any one of Examples AA1-AA6 can optionally include where the electronic device includes two displays.

Example X1 is a machine-readable storage medium including machine-readable instructions to implement a method or realize an apparatus as in any one of the Examples A1-A7, M1-M7, or AA1-AA7. Example Y1 is an apparatus comprising means for performing any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device comprising:
 a first display;
 a second display; and
 a basic input/output system (BIOS), wherein during a boot process for the electronic device, before a premem stage and memory reference code (MRC) initialization, the BIOS communicates a signal to power enable the first display and the second display.

2. The electronic device of claim 1, wherein the BIOS communicates the signal to power enable the first display and the second display after general-purpose input/output initialization during the boot process.

3. The electronic device of claim 1, wherein after the premem stage and MRC initialization are completed, the first display and the second display are both configured to begin to display pixels.

4. The electronic device of claim 1, further comprising:
 a first power switch/supply associated with the first display, wherein the first power switch/supply receives the signal from the BIOS to power enable the first display; and
 a second power switch/supply associated with the second display, wherein the second power switch/supply receives the signal from the BIOS to power enable the second display.

5. The electronic device of claim 1, further comprising:
 a first display engine to determines if a hot plug is asserted for the first display; and
 a second display engine to determines if a hot plug is asserted for the second display.

6. The electronic device of claim 5, wherein, for each display where the hot plug was not asserted, a power path to the display where the hot plug was not asserted is closed.

7. The electronic device of claim 1, wherein the first display and the second display each have their own power path and the first display and the second display can independently enter a low power state.

8. A method comprising:
 determining that an electronic device is powered on;
 starting a boot process for the electronic device;
 using a basic input/output system (BIOS), power enabling a predetermined number of displays before a premem state and memory reference code (MRC) initialization of the boot process;
 determining if each display from the predetermined number of displays is active; and
 closing a power path to any displays that are not active.

9. The method of claim 8, wherein each active display has its own power path.

10. The method of claim 8, wherein a display engine determines if a hot plug for each display is asserted and the hot plug for a specific display is used to determine if the specific display is active.

11. The method of claim 10, wherein, for each display where the hot plug was not asserted, the power path to the display where the hot plug was not asserted is closed.

12. The method of claim 8, wherein each active display has its own power path and can enter a low power state independent of other displays.

13. The method of claim 8, wherein the BIOS causes power to be enabled to the predetermined number of displays after general-purpose input/output initialization.

14. The method of claim 8, wherein the electronic device includes two displays.

15. A system for enabling a similar boot time for multiple displays in an electronic device, the system comprising:
 a power supply; and
 a basic input/output system (BIOS), wherein on startup of the electronic device, during a boot process, the BIOS causes power from the power supply to be enabled to each of the multiple displays on a separate power path.

16. The system of claim 15, wherein the BIOS causes the power to be enabled to the multiple displays before a premem state and memory reference code (MRC) initialization of the electronic device.

17. The system of claim 15, wherein a display engine determines if a hot plug for each display is asserted.

18. The system of claim 17, wherein, for each display where the hot plug was not asserted, the power path to the display where the hot plug was not asserted is closed.

19. The system of claim 15, wherein each active display has its own power path and can enter a low power state independent of other displays.

20. The system of claim 19, wherein the BIOS causes power to be enabled to the multiple displays after general-purpose input/output initialization.

* * * * *